C. G. WESTERBERG.
RIM FOR VEHICLE WHEELS.
APPLICATION FILED JULY 27, 1918. RENEWED NOV. 23, 1920.
1,383,358.
Patented July 5, 1921.
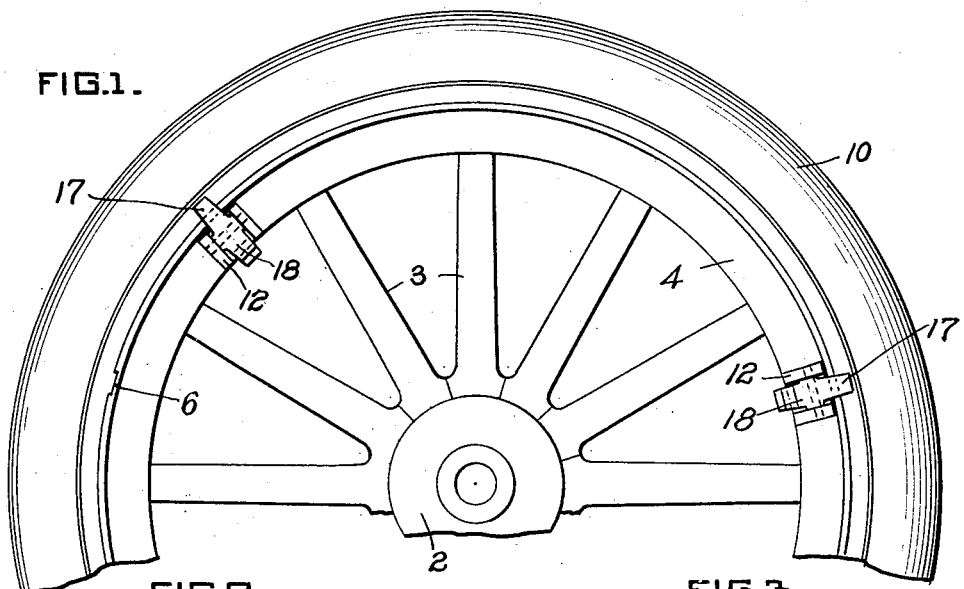
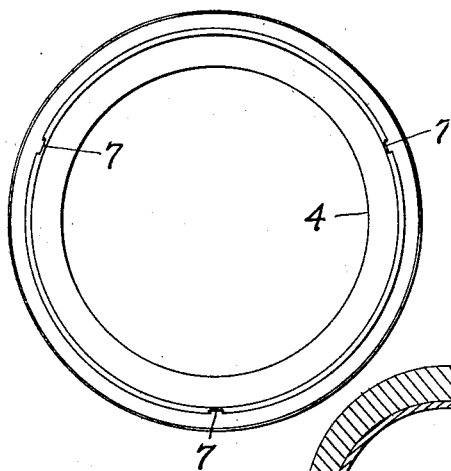
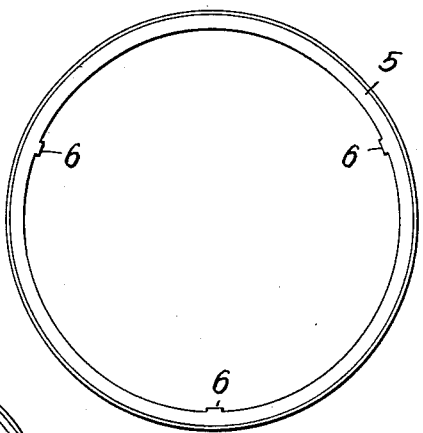
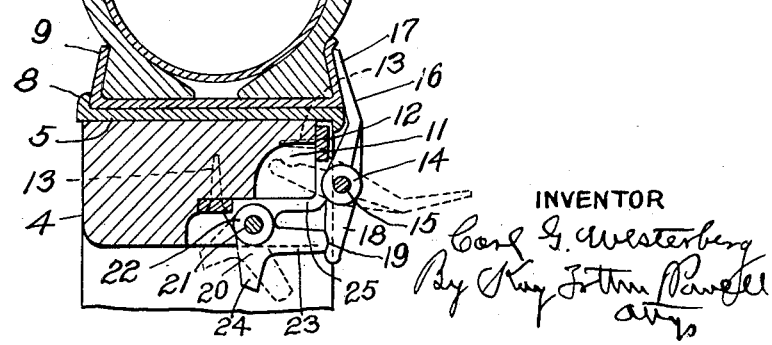
INVENTOR

UNITED STATES PATENT OFFICE.

CARL G. WESTERBERG, OF MONESSEN, PENNSYLVANIA.

RIM FOR VEHICLE-WHEELS.

1,383,358. Specification of Letters Patent. Patented July 5, 1921.

Application filed July 27, 1918, Serial No. 247,046. Renewed November 23, 1920. Serial No. 426,105.

*To all whom it may concern:*

Be it known that I, CARL G. WESTERBERG, a citizen of the United States, and resident of Monessen, in the county of Westmoreland and State of Pennsylvania, have invented a new and useful Improvement in Rims for Vehicle-Wheels; and I do hereby declare the following to be a full, clear, and exact description thereof.

My invention relates to tires for vehicles, and more especially to a demountable rim and means for removably securing the rim to the wheel-body.

The object of my invention is to provide a simple and efficient means by which the rim may be securely held in position and be quickly applied or removed without the use of any special form of tools.

To these ends my invention comprises the novel features hereinafter set forth and claimed.

In the accompanying drawing, Figure 1 is a face view of a portion of a wheel showing my invention applied thereto; Fig. 2 is a reduced view of the rim applied to the felly; Fig. 3 is a view of a rim; and Fig. 4 is a section of the tire and felly showing my invention applied thereto.

In the drawing, the numeral 2 designates the hub with the spokes 3 radiating therefrom to the felly 4. The felly rim 5 may be of the ordinary construction with the lugs 6 which fit in notches 7 formed in the felly 4. This felly rim has the flange 8 with which one side of the demountable rim 9 is adapted to engage when said rim is slipped over the felly rim, as shown in Fig. 4. The demountable rim 9 carries the pneumatic tire 10.

The felly is cut away at points to form the recesses 11 and brackets 12 are secured to the said felly by screws 13 at said recesses. These brackets are preferably formed in one piece and have the bearings 14 in which are journaled the shafts 15 which carry the locking levers 16. These locking levers have fingers 17 which are adapted to engage one side of the demountable rim 9 to hold said rim in position on the felly rim 5 and up against the flange 8 of said felly rim. The levers 16 have the arms 18 at the lower ends, said arms having notches 19 formed therein. In order to hold the levers 16 in locking position, I provide the bell crank 20 which is mounted on the shaft 21 journaled in bearings 22 on the brackets 12. The arms 23 of the bell cranks 20 engage the arms 18 of the levers and fit in the notches 19 formed in said arms 18.

In applying the demountable rim, the rim is slipped in position over the felly rim 5 until it abuts against the flange 8 of said felly rim, whereupon the levers 16 are swung up in position to bring the fingers into engagement with the demountable rim, whereupon the bell cranks 20 are swung up in position to bring the arms 23 into engagement with the arms 18 of the lever 16 and sufficient force will be applied by a hammer to force the arms 23 into engagement with the recesses 19 in the arms 18, so that when the bell cranks are brought into this position, they will securely lock and hold the levers 16 in their upright position. When it is desired to remove the rim, a blow applied to the arm 24 of the bell crank 20 will release the arms 23 from the arm 18 of the lever 16 and the bell crank will drop to the position indicated in dotted lines, Fig. 4, while at the same time the levers 16 being released will drop back to the position in dotted lines, Fig. 4, the arm 18 of the levers swinging up into the recess 11 formed in the felly 4. The bracket 12 is cut away as at 25 to permit of the arm 18 swinging up into the recess 11.

By my invention, I provide a very simple and efficient device for securing the demountable rim in position, and when once locked the rim will be securely held against displacement and at the same time when it is desired to remove the rim, it will only be necessary to apply a blow to the rim 24 of the bell crank to release the lever 16 and said blow may be applied with a rock or any other object when no hammer is at hand. No tools of special construction are required for applying or removing the rim, and it can be done with the greatest ease and rapidity.

What I claim is:

1. The combination with a felly, of a felly rim having an abutment, a demountable rim surrounding said felly, a rim engaging said abutment, a plurality of pivotally mounted levers on said felly, the upper ends of said levers engaging said demountable rim, and bell cranks mounted on said felly, one of the arms of said bell cranks engaging the lower ends of said levers below the pivotal points of said levers and on the inner sides thereof.

2. The combination with a felly, of a felly rim having an abutment, a demountable rim surrounding said felly rim adapted to engage said abutment, a plurality of pivotally mounted levers on said felly, the upper ends of said levers engaging said demountable rim, bell cranks mounted on said felly, one of the arms of said bell cranks engaging the lower ends of said levers, and said levers having notches to receive said arms on the inner sides of said levers below the pivotal points.

3. The combination with a felly, of a felly rim thereon having an abutment, a demountable rim adapted to engage said abutment, a series of brackets on said felly, a plurality of levers carried by said brackets, the upper ends of said levers adapted to engage said demountable rim, a plurality of bell cranks mounted on said brackets adapted to engage the lower ends of said levers, and said brackets having cut-away portions to admit the lower ends of said levers when said levers are released.

In testimony whereof, I, the said CARL G. WESTERBERG, have hereunto set my hand.

CARL G. WESTERBERG.

Witnesses:
J. C. SHERRIFF,
ROBT. D. TOTTEN.